US007203591B2

(12) United States Patent
Wagner et al.

(10) Patent No.: US 7,203,591 B2
(45) Date of Patent: Apr. 10, 2007

(54) METHOD FOR CONTROLLING AN INTERNAL COMBUSTION ENGINE

(75) Inventors: Horst Wagner, Stuttgart (DE); Rolf Maier-Landgrebe, Kernen (DE); Thomas Farr, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/169,205

(22) Filed: Jun. 27, 2005

(65) Prior Publication Data

US 2006/0030996 A1 Feb. 9, 2006

(30) Foreign Application Priority Data

Jun. 25, 2004 (DE) ...................... 10 2004 030 759

(51) Int. Cl.
*F02D 41/14* (2006.01)
*G06F 19/00* (2006.01)

(52) U.S. Cl. ...................... 701/109; 701/103; 701/110

(58) Field of Classification Search .............................. 123/406.59–406.65, 673–675, 679, 691, 123/692, 698, 699, 478, 480; 701/103–105, 701/109–111, 115

See application file for complete search history.

(56) References Cited

U.S. PATENT DOCUMENTS

| | | | | |
|---|---|---|---|---|
| 4,984,551 | A * | 1/1991 | Moser | 123/692 |
| 5,515,828 | A | 5/1996 | Cook et al. | |
| 5,687,699 | A * | 11/1997 | Shimada et al. | 123/673 |
| 6,029,641 | A * | 2/2000 | Suzuki et al. | 123/673 |
| 6,148,808 | A * | 11/2000 | Kainz | 123/673 |
| 6,155,227 | A * | 12/2000 | Shimada et al. | 123/698 |
| 6,382,198 | B1 * | 5/2002 | Smith et al. | 123/673 |
| 6,516,772 | B2 * | 2/2003 | Ueno et al. | 123/698 |
| 6,675,787 | B2 * | 1/2004 | Damitz et al. | 123/673 |
| 6,792,927 | B2 * | 9/2004 | Kobayashi | 123/673 |
| 2002/0033151 | A1 | 3/2002 | Bayer | |
| 2002/0121268 | A1 | 9/2002 | Graf et al. | |
| 2003/0047166 | A1 | 3/2003 | Hess et al. | |

FOREIGN PATENT DOCUMENTS

| | | |
|---|---|---|
| DE | 19527218 | 6/1996 |
| EP | 1 215 388 | 9/2001 |
| EP | 1132600 | 9/2001 |

* cited by examiner

*Primary Examiner*—Willis R. Wolfe, Jr.
(74) *Attorney, Agent, or Firm*—Kenyon & Kenyon LLP

(57) ABSTRACT

A method for controlling an internal combustion engine in which each cylinder of the internal combustion engine is assigned at least one system deviation and at least one controller, each controller predefining a cylinder-specific control signal on the basis of the assigned system deviation, is characterized in that at least one first controller which predefines the control signal as a function of at least one signal characterizing the rotational speed of the internal combustion engine is provided, and at least one second controller which predefines the control signal as a function of at least one signal characterizing the exhaust-gas composition is provided; and, as a function of at least one operating parameter characterizing the operating state of the internal combustion engine, the control signal is predefined either by the at least one first or the at least one second controller or by a combination of a control signal generated by the at least one first controller and a control signal generated by the at least one second controller.

8 Claims, 2 Drawing Sheets

Fig. 1
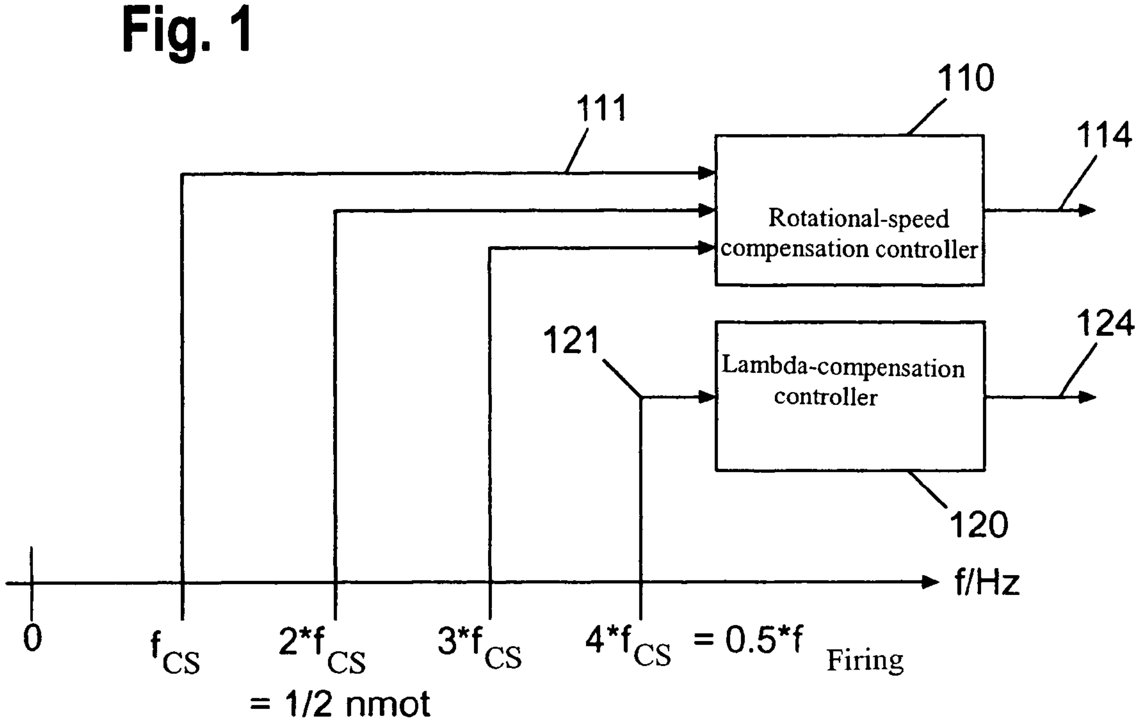
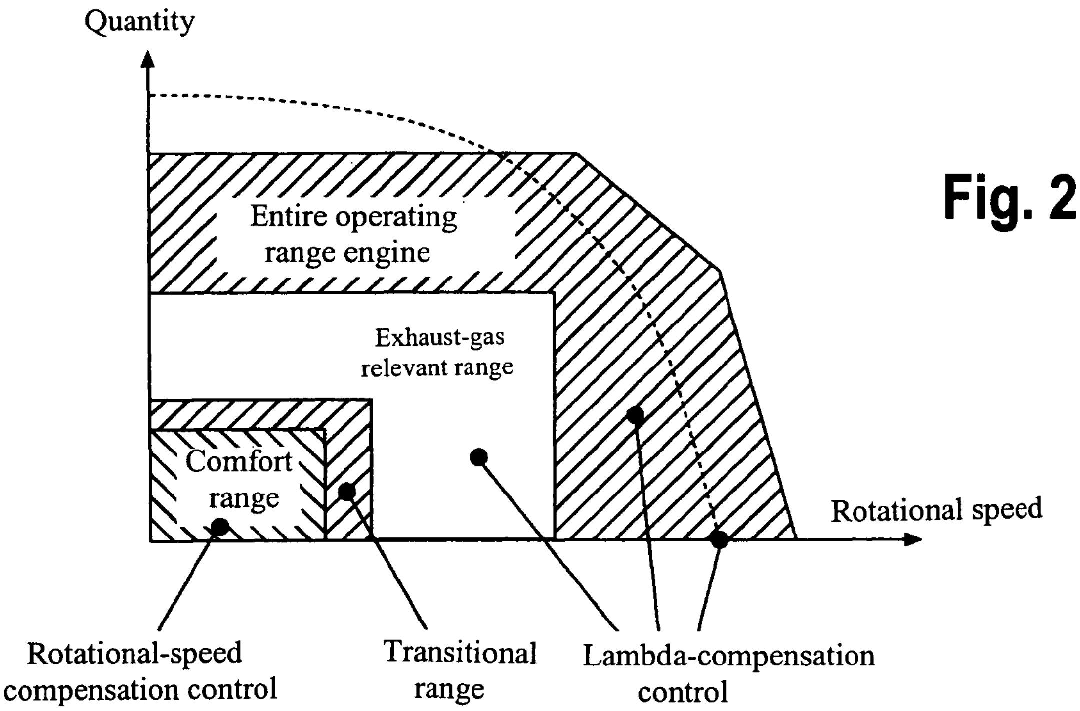
Fig. 2

Fig. 3
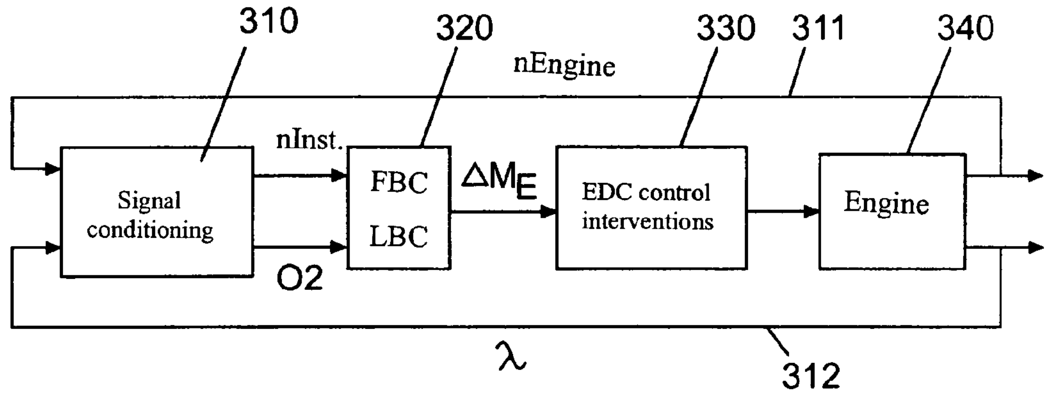
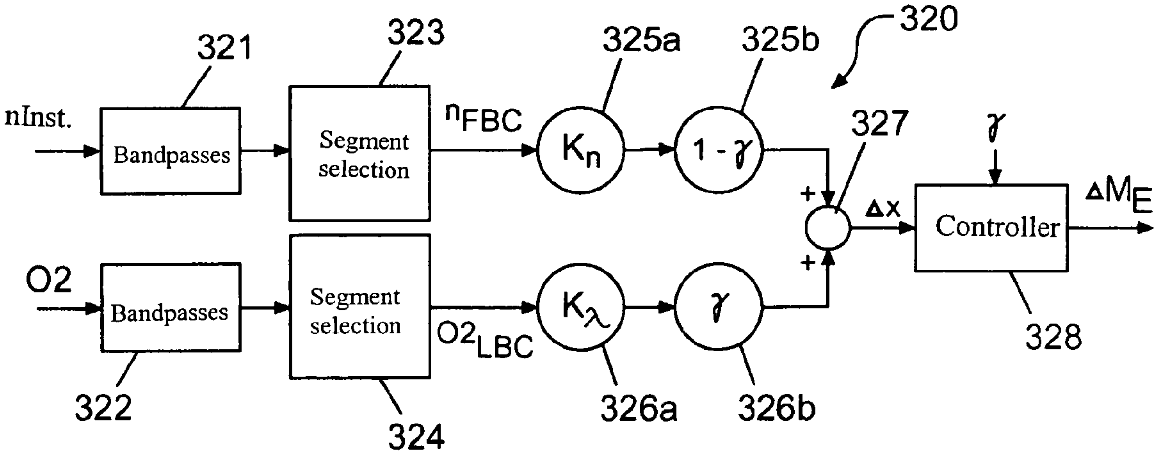
Fig. 4

METHOD FOR CONTROLLING AN INTERNAL COMBUSTION ENGINE

FIELD OF THE INVENTION

The present invention relates to a method for controlling an internal combustion engine

BACKGROUND INFORMATION

Due to slight differences in the individual cylinders of an internal combustion engine, they generate slightly different torques and emissions during the combustion process. These torque differences cause the so-called "shaking" of the engine, for instance, as well as audible torque fluctuations. To compensate for such torque differences, a so-called smooth-running control, which determines and corrects the injection quantity of the individual cylinders as a function of the recorded engine speed, is known from the related art. However, this smooth-running control can be utilized only at low engine speeds since production-related tooth-pitch errors of the pulse-generator wheel normally utilized to measure the rotational speed and the crankshaft torsion interfere with the rpm measurement. The effect of these interferences is greater at high engine speeds than at low speeds. To compensate for such interference, a quantity compensation control is implemented, which takes these interferences into account with the aid of a pulse-generator adaptation and a torsion compensation. However, this quantity-compensation control, too, can be utilized only at low and medium engine speeds.

A lambda-based cylinder-compensation control is known from European Published Patent Application No. 1 215 388. Here, the lambda value of the exhaust gas of the individual cylinders is selectively equalized with the aid of a lambda-based cylinder-compensation control. To this end, correction quantities for the injection quantities of the individual cylinders are determined from the signal of at least one lambda probe. If the resolution of the lambda-probe signal is of sufficient quality, the cylinder-compensation control can be utilized in a broad engine speed and load range.

While the smooth-running control and the cylinder-compensation control do use the same control intervention, they nevertheless are competing methods as far as the purpose of the cylinder-compensation regulation is concerned, so that both methods may not be active simultaneously in an uncoordinated manner. This applies especially when cylinder-specific efficiencies, rpm-measuring errors, torque pick-offs in an engine frequency, different oxygen charging of the cylinders and different exhaust-gas recirculation rates are present.

As a consequence, the present invention is based on the objective of providing a method for controlling an internal combustion engine of the type described in the introduction, such method allowing the simultaneous intervention of both a smooth-running control and a lambda-based cylinder-control.

SUMMARY OF THE INVENTION

The basic idea of the present invention is to provide at least one first controller which specifies the control signal as a function of at least one signal characterizing the engine speed of the internal combustion engine; and at least one second controller which specifies the control signal as a function of at least one signal characterizing the exhaust-gas composition, the cylinder-specific control signal being input as a function of at least one performance quantity characterizing the operating state of the internal combustion engine, either by the at least one first controller or the at least one second controller, or, in certain operating points, also by a combination of the control signal of the at least one first controller and the control signal of the at least one second controller. This utilizes both the smooth-running control and the cylinder-compensation control to determine the control signal as a function of the operating state.

It is possible to combine the control signals of the two controllers since both controllers use the same control intervention. Selecting the controllers as a function of the operating state of the internal combustion engine prevents that both controllers work in opposition so to speak and the two closed-loop control circuits interfere with one another and become unstable as a result.

In one advantageous development of the present method, for instance, the at least one performance quantity characterizing the operating state of the internal combustion engine is the easily measurable camshaft frequency. The frequency spectrum of the camshaft frequency is subdivided into frequency ranges, and each frequency range is assigned to the first or the second or none of the two controllers.

The at least one performance quantity characterizing the operating state of the internal combustion engine may also be one or a plurality of predefinable quantity-rotational speed-ratio(s), i.e., one or several operating range(s), which are preferably selected from a quantity-rotational speed characteristics map characterizing operating ranges. Operating range is understood here as a certain interval of quantity-rotational speed ratios—also known as working points—of an internal combustion engine, which are representable by planes in a quantity-rotational speed characteristics map.

In another embodiment of the method, the at least one performance quantity characterizing the operating state of the internal combustion engine and used as decision criterion for the choice of controllers, is the time or the type of injection. For instance, the control signal of a self-ignitable internal combustion engine is predefined either by the at least one first controller or the at least one second controller, or by a combination of the control signal of the at least one first controller and the control signal of the at least one second controller, depending on whether a pre-injection or a main injection is carried out.

A combination of the control signal of the at least one first controller and the at least one second controller is able to be achieved in various ways. In an advantageous development, the combination is formed by adding weighted control signals of the at least one first and the at least one second controller.

A combination of the control signals is preferably implemented as a function of predefinable quantity-rotational speed ratios, i.e., as a function of operating ranges of the internal combustion engine that are advantageously selected from a quantity-rotational speed characteristics map.

BRIEF DESCRIPTION OF THE DRAWINGS

FIG. 1 shows a block diagram of a first development of the method, in a schematic representation.

FIG. 2 shows a quantity-rotational speed characteristics map in a schematic representation to elucidate different operating ranges of the internal combustion engine.

FIG. 3 shows a block diagram of another development of the method in a schematic representation.

FIG. 4 shows a block diagram to elucidate the development of the method illustrated in FIG. 3.

DETAILED DESCRIPTION

A first exemplary embodiment of a method for controlling an internal combustion engine, shown in FIG. 1, includes a first controller 110 and a second controller 120 to which performance quantities 111, 121 which characterize the respective operating state of an internal combustion engine (not shown in FIG. 1) are supplied. As schematically shown in FIG. 1, these performance quantities are multiples of camshaft frequency $f_{CS}$. Up to a specific threshold of the multiple of this camshaft frequency $f_{CS}$, in the case at hand, up to triple the camshaft frequency, the first controller—a rotational speed-compensation controller 110—generates an output signal 114 for the cylinder-individual control. Above this threshold, the second controller—a lambda-compensation controller 120—generates a control signal 124 for the cylinder-individual controlö the variable characterizing the operating state of the internal combustion engine at which lambda-compensation controller 120 generates control signal 124 for the cylinder-individual control is four times the camshaft frequency, which corresponds to half the firing frequency in an eight-cylinder internal combustion engine. The compensating controls for these frequencies are activated by suitable filtering known per se, for instance by bandpass filters and averaging. In this embodiment, rotational-speed compensation controller 110 and lambda-compensation controller 120 are active at the same time. This type of control may be implemented in particular when the internal combustion engine has a dual-branch air system and the firing order is alternately assigned to this air system. In this case, due to the two air systems, a systematic error of air ratio λ with half the firing frequency is to be expected.

In another specific embodiment, the control of the first controller, i.e., the afore-described rotational-speed compensation controller 110, and the second controller, i.e., lambda-compensation controller 120, is implemented as a function of the operating range of the internal combustion engine which is characterized by predefinable injection-quantity-rotational speed ratios. In FIG. 2, such different operating ranges of the internal combustion engine are schematically illustrated with the aid of a quantity-rotational speed characteristics map. At low rotational speed and small injected quantity, a rotational-speed compensation controller 110 implements a rotational-speed compensation control in a so-called comfort range. In contrast, in the exhaust-relevant range and in the remaining operating range, a lambda-compensation control takes place via lambda-compensation controller 120. In an operating range denoted as transitional range, a combination of the controlled variables is implemented as described in the following.

FIG. 3 schematically shows a circuit configuration for implementing the control in this transitional range. In a first circuit module 310, signal conditioning takes place, and the instantaneous rpm signal $n_{inst}$ as well as the air ratio—denoted by $O_2$ in FIG. 3—is supplied to a circuit module 320, which allows a combination of the two controllers 110, 120 to be described in more detail in the following. This circuit module 320 generates a control signal $\Delta M_E$ which is forwarded to another circuit module 330 to implement control interventions at an internal combustion engine 340. Engine-speed $n_{engine}$ of internal combustion engine 340, measured by sensor means known per se, and the λ value are returned again to circuit module 310 via signal lines 311, 312. Two simultaneously acting closed-loop controls are realized in this manner.

Circuit module 320, which represents the actual combination of the closed-loop controls, is shown in greater detail in FIG. 4. Circuit module 320 has a first bandpass 321 and a second bandpass 322. First bandpass 321 is provided with conditioned rpm signal $n_{inst}$, second bandpass 322 is provided with conditioned "oxygen signal" $O_2$. In a first circuit module 323, an rpm signal $n_{FBC}$ is generated for a rotational speed compensation control, while in a second circuit module 324 a signal $O2_{LBC}$ is produced for a lambda-compensation control. The signals are weighted in circuit modules 325*a*, 325*b* as well as 326*a*, 326*b*, added in a summing element 327, and forwarded to a controller 328 which forms control signal $\Delta M_E$ for the internal combustion engine.

A weighting factor γ, which is taken into account in circuit modules 325*b* and 326*b*, decides which controller will be intervening and to what extent. At γ=0, only the rotational-speed controller is intervening, whereas at γ=1 only the lambda-compensation controller is active. In the range of 0<γ<1, both the rotational-speed controller and the smooth-running controller are intervening—i.e., rotational-speed controller with the weighting 1−γ, and the smooth-running controller with the weighting γ. Weighting factor γ is ascertained as a function of the operating state of the internal combustion engine, i.e., as a function of the load, the rotational speed and the like, utilizing characteristics maps. For instance, at low rotational speeds, γ is preferably assigned the value 0 since the smooth-running controller is preferably used here. However, at higher rotational speeds the smooth-running controller is subject to strong interference by torsional vibrations. As a result, γ is preferably set to 1. A controlled variable Δx (FIG. 4) specified by the summing element is ascertained by the equation $$\Delta x = K_n \cdot (1-\gamma) \cdot n_{FBC} + K_\lambda \cdot \gamma \cdot O2_{LBC}.$$

In this context, $n_{FBC}$ is the original controlled variable of the rotational-speed controller, and $O2_{LBC}$ the original controlled variable of the lambda-compensation controller. Factors $K_n$ and $K_\lambda$ are scaling factors to be specified, which adapt different loop gains of the two controllers to each other. At γ<0.5, the rotational-speed compensation controller exerts greater influence on the control, whereas at γ=0.5 the influence of the rotational-speed compensation controller and the lambda-compensation controller are approximately equally strong, and at 0.5<γ<1, the influence on the regulation is determined by the lambda-compensation control. In the event that the rotational-speed controller and the lambda-compensation controller require different control parameter values, weighted control parameter values analogously to the controlled variable in the form $P = P_{FBC} \cdot (1-\gamma) + P_{LBC} \cdot \gamma$ may be ascertained in the combination by interpolation via γ. These measures also avoid unsteadiness (jumps) in the control interventions.

In another development of the method, the performance parameter characterizing the operating state of the internal combustion engine is determined by the timing of the injection, i.e., whether a pre-injection, main injection or post-injection is predefined, the timing of the pre-injection, main injection or the post-injection being determined by the crankshaft angle, for example.

Combinations of the afore-described different embodiments are possible as well.

What is claimed is:

1. A method for controlling an internal combustion engine, comprising:

assigning each cylinder of the internal combustion engine at least one system deviation and at least one controller, each controller specifying a cylinder-specific control signal on the basis of the assigned system deviation, providing at least one first controller that specifies a control signal as a function of at least one signal characterizing a rotational speed of the internal combustion engine;

providing at least one second controller that specifies the control signal as a function of at least one signal characterizing an exhaust-gas composition;

as a function of at least one performance quantity characterizing an operating state of the internal combustion engine, specifying the control signal by one of a first group and a second group, the first group including the at least one first controller and the at least one second controller, and the second group including a combination of a control signal generated by the at least one first controller and a control signal generated by the at least one second controller.

2. The method as recited in claim 1, wherein the at least one performance quantity characterizing the operating state of the internal combustion engine is determined by a timing of an injection.

3. The method as recited in claim 1, wherein the combination is an addition of weighted control signals of the at least one first and the at least one second controller.

4. The method as recited in claim 1, wherein the combination of the control signals of the at least one first controller and the at least one second controller is implemented as a function of predefinable quantity-rotational speed ratios of the internal combustion engine.

5. The method as recited in claim 1, wherein the at least one performance quantity characterizing the operating state of the internal combustion engine is a camshaft frequency.

6. The method as recited in claim 5, wherein a frequency spectrum of the camshaft frequency is subdivided into frequency ranges, and each frequency range is assigned either to the first or the second or to none of the two controllers.

7. The method as recited in claim 1, wherein the at least one performance quantity characterizing the operating state of the internal combustion engine includes predefinable quantity-rotational speed ratios.

8. The method as recited in claim 7, wherein the predefinable quantity-rotational speed ratios are selected from a quantity-rotational speed characteristics map.

* * * * *